United States Patent
Nations, Jr.

(10) Patent No.: US 9,593,786 B1
(45) Date of Patent: Mar. 14, 2017

(54) LEAK PROOF THREADED CONNECTOR

(71) Applicant: PRECISION COUPLINGS, LP, Houston, TX (US)

(72) Inventor: Michael Keith Nations, Jr., Houston, TX (US)

(73) Assignee: PRECISION COUPLINGS, LLC, Houston, TX (US)

( * ) Notice: Subject to any disclaimer, the term of this patent is extended or adjusted under 35 U.S.C. 154(b) by 0 days.

(21) Appl. No.: 14/853,495

(22) Filed: Sep. 14, 2015

Related U.S. Application Data

(60) Provisional application No. 62/058,593, filed on Oct. 1, 2014.

(51) Int. Cl.
*F16L 15/00* (2006.01)
*E21B 17/042* (2006.01)

(52) U.S. Cl.
CPC .......... *F16L 15/007* (2013.01); *E21B 17/042* (2013.01)

(58) Field of Classification Search
CPC .................................................. F16L 15/06
See application file for complete search history.

(56) References Cited

U.S. PATENT DOCUMENTS

| | | |
|---|---|---|
| 2,177,100 A | 10/1939 | Frame |
| RE30,647 E | 6/1981 | Blose |
| 4,600,224 A | 7/1986 | Blose |
| 4,822,081 A | 4/1989 | Blose |
| RE34,467 E | 12/1993 | Reeves |
| 5,427,418 A * | 6/1995 | Watts ................. E21B 17/042 285/333 |
| 5,431,831 A * | 7/1995 | Vincent ................... C09K 3/10 106/33 |
| 6,578,880 B2 | 6/2003 | Watts |
| 6,722,706 B2 | 4/2004 | Church |
| 7,475,917 B2 | 1/2009 | Sivley, IV et al. |
| 7,850,211 B2 | 12/2010 | Reynolds, Jr. et al. |
| 8,641,100 B2 | 2/2014 | Patureau et al. |
| 8,678,448 B2 | 3/2014 | Maillon et al. |
| 8,827,322 B2 | 9/2014 | Granger et al. |
| 2004/0195835 A1* | 10/2004 | Noel ..................... F16L 15/001 285/333 |
| 2006/0089976 A1* | 4/2006 | Breihan ............... F16L 15/001 709/218 |
| 2006/0214421 A1* | 9/2006 | Muradov .............. E21B 17/042 285/333 |
| 2009/0200798 A1* | 8/2009 | Hamamoto .......... E21B 17/042 285/334 |
| 2010/0078936 A1* | 4/2010 | Nakamura .............. F16L 15/06 285/334 |
| 2012/0298249 A1* | 11/2012 | Banker ................. E21B 17/042 138/177 |

* cited by examiner

*Primary Examiner* — David E Sosnowski
*Assistant Examiner* — James Linford
(74) *Attorney, Agent, or Firm* — Buskop Law Group, PC; Wendy Buskop

(57) ABSTRACT

A threaded connection for pipe or tubulars used in drill strings, casing, or production tubing. The threaded connection can have a box connector with box threads having a plurality of box thread teeth and a pin member with pin threads having a plurality of pin thread teeth. The teeth can have a crest, a load flank, a stab flank and a root. A restriction can be between the pin member and the box connector on the stab flank, wherein the restriction does not touch the pin member, and the restriction forms a first channel and a second channel for containing a thread sealing compound.

11 Claims, 6 Drawing Sheets

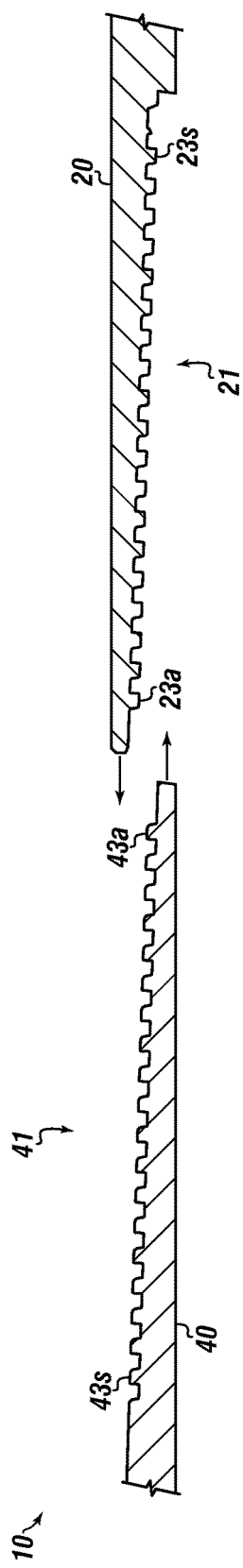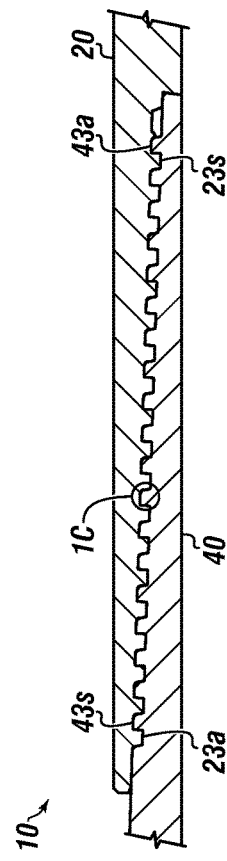
FIGURE 1A
FIGURE 1B

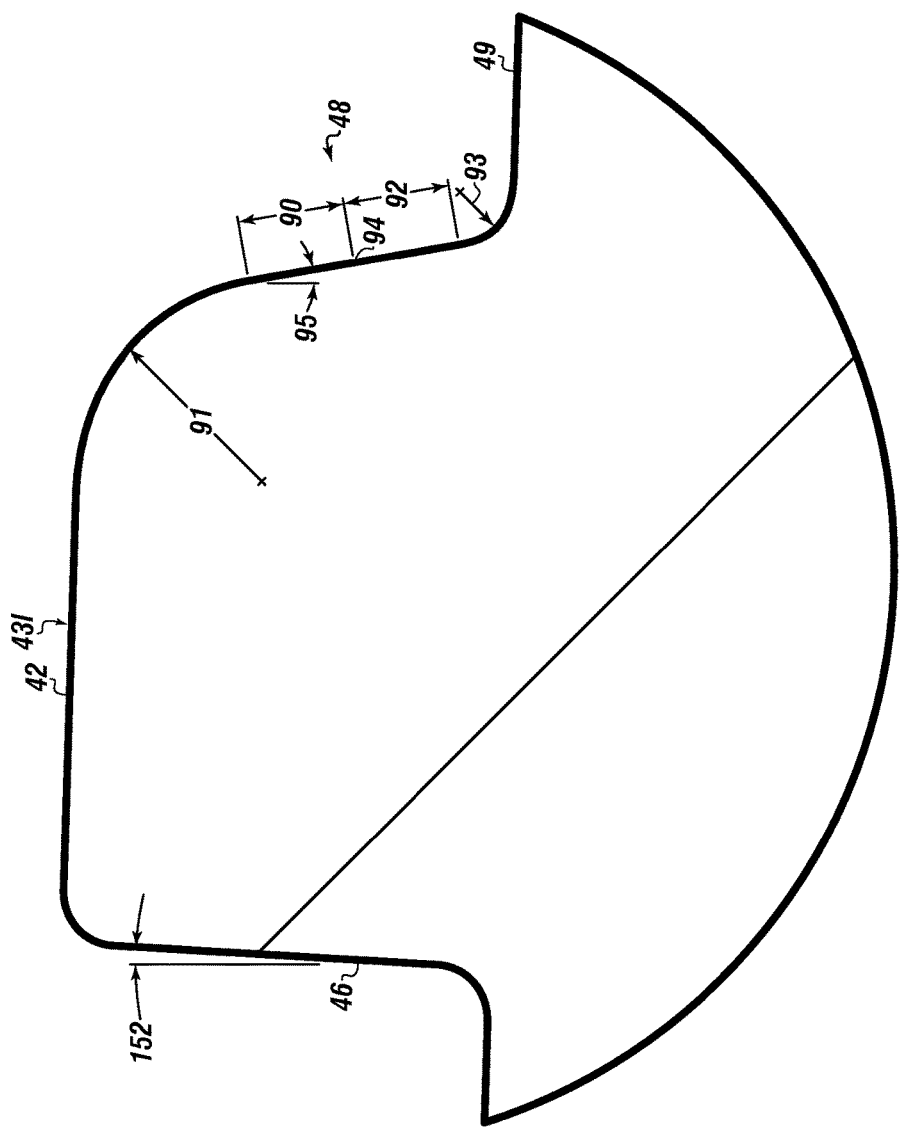

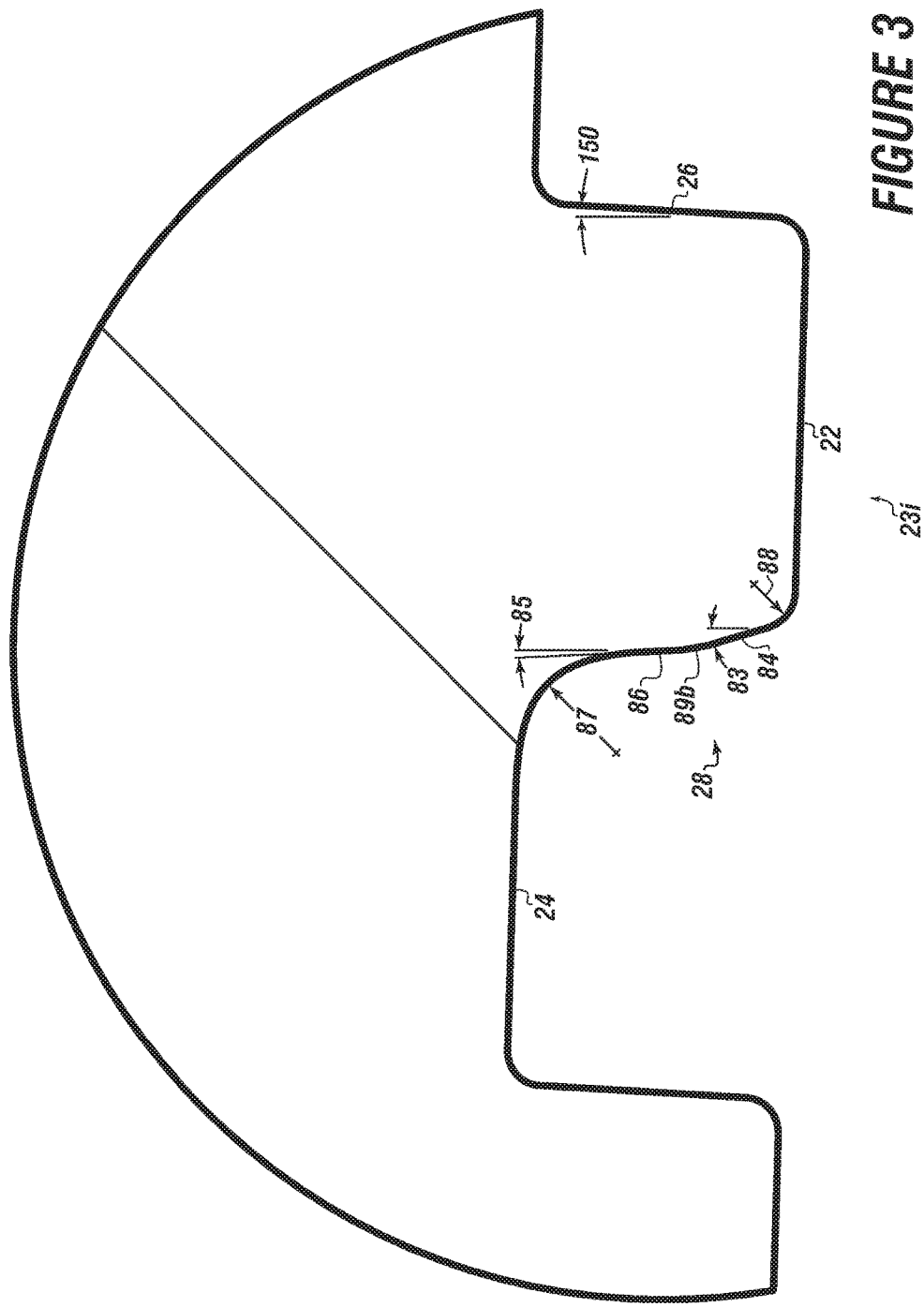

LEAK PROOF THREADED CONNECTOR

CROSS REFERENCE TO RELATED APPLICATION

The current application claims priority to and the benefit of U.S. Provisional Patent Application Ser. No. 62/058,593 filed on Oct. 1, 2014, entitled "LEAK PROOF THREADED CONNECTOR." This reference in hereby incorporated herein in its entirety.

FIELD

The present embodiments generally relate to a threaded connection for pipe or tubulars used in drill strings, casing, or production tubing.

BACKGROUND

A need exists for a threaded pipe connection with angled threads and channels that prevent leakage of fluid between the pin member and the box connector when the pipes or tubulars are in a made up condition, forming one or more seals.

The present embodiments meet these needs.

BRIEF DESCRIPTION OF THE DRAWINGS

The detailed description will be better understood in conjunction with the accompanying drawings as follows:

FIG. 1A depicts an unmated threaded connection according to one or more embodiments.

FIG. 1B is a mated threaded connection of FIG. 1A according to one or more embodiments.

FIG. 2 is a detail of a pin thread tooth usable in the threaded connection according to one or more embodiments.

FIG. 3 is a detail of a box thread tooth usable in the threaded connection according to one or more embodiments.

Figure 1C:
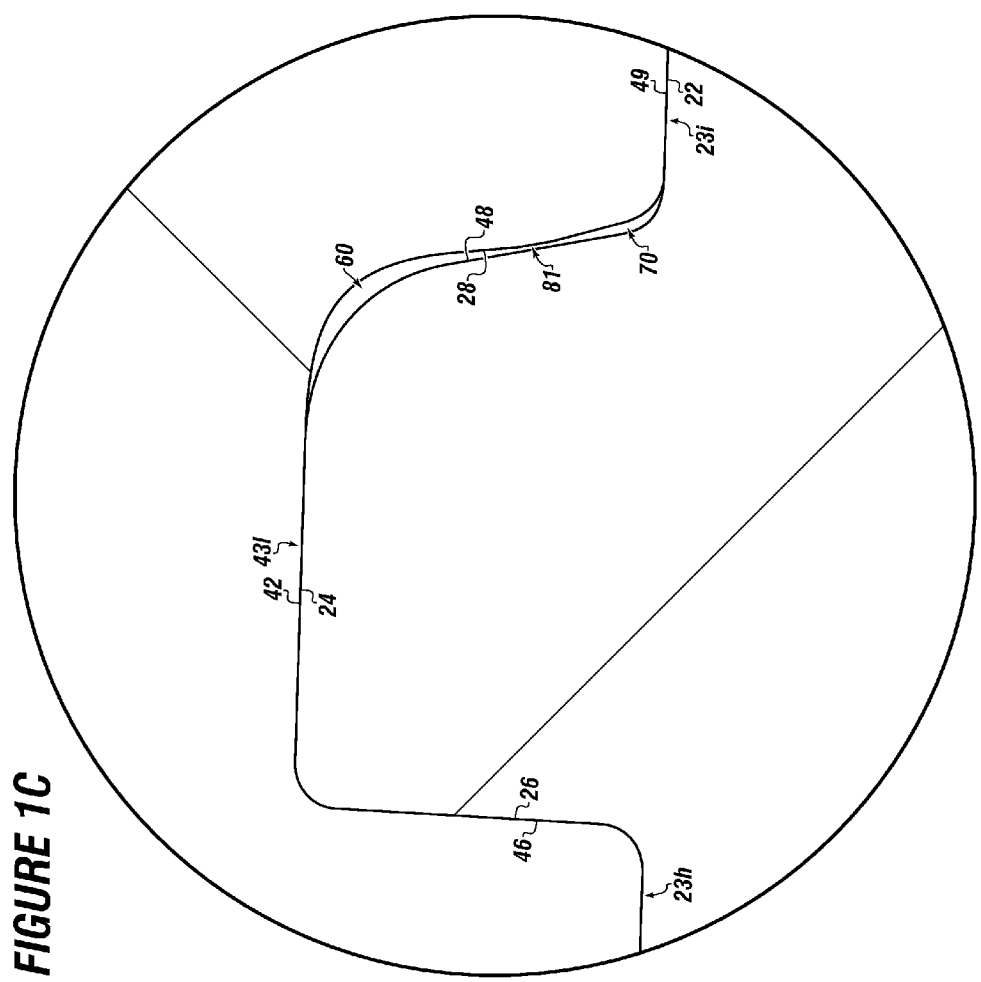
FIG. 1C is a detail of two box thread teeth and a pin thread tooth forming a restriction location according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

A benefit of the present embodiments is that the threaded connection can prevent liquid leaking, thereby preventing toxic spills.

The present embodiments can improve sealing by separating and providing a restriction between the long helical paths and the stab flanks of threaded connections.

The present embodiments can stabilize the threads under cyclic axial loads of tension and compression, as well as under bending loads, by reducing stab flank clearance, which can restrict the movement or deformation of the engaged threads.

A benefit of the present embodiments is that it can prevent hydraulic locking, which can prevent the threaded connection from being fully tightened, thereby causing leaks. The stab flank clearances of the present embodiments can prevent hydraulic locking of square thread buttress connections.

As used herein the term "box connector" can refer to a female threaded portion of a threaded connection which can be made up of internal threads in a helical configuration. The box connector can engage a pin member. The box connector can be formed on a pipe or another piece of steel that is round and has a conduit therein, such as a tubular. The box connector can be a separate piece of a pipe joint.

The term "box crest" as used herein can refer to an apex of the thread form of the invention, such as a buttress thread form. The apex or crest, for example, for a buttress thread form, can be trapezoidal in shape, such as square or rectangular.

The term "box load flank" as used herein can refer to a portion of the box connector that can conjoin and transfer an axial tension after the box connector conjoins the pin member. The box load flank can be a surface of the box connector thread tooth opposite the box stab flank.

The term "box root" as used herein can refer to a valley portion of the thread form of the invention, which can be a buttress thread form. The valley portion of the thread form can be trapezoidal in shape, such as square or rectangular.

The term "box stab flank" as used herein can refer to a surface of the box thread tooth that can meet a pin stab flank to restrict the axial movement of the threaded connection prior to threading pipes into the threaded connection. The box stab flank can provide compressive load resistance as the pipes are engaged.

The term "box thread" as used herein can refer to an internal thread of a box connector. The box thread can have a load flank, a stab flank, a root and a crest. A box thread can be a threaded fastener for joining two male threads together, most commonly in a threaded configuration.

The term "box thread tooth" as used herein can refer to a portion of the box connector which can remain after a groove has been cut in material forming the box connector, such as by a threading tool. The "box thread tooth" can have three sides, a stab flank, a box crest and a load flank.

The term "buttress connection" as used herein can refer to a thread connection defined by American Petroleum Institute Specification API 5-B described in the 15th edition of API, April 2008 and in effect as of the filing date of this patent application in 2015.

The term "channel" as used herein can refer to the opening between the stab flanks of the pin member and the box connector. A channel can be created from a composite of angles, splines or curves cut into a stab flank or a modified stab flank of either the box connector or the pin member.

The term "point restriction" as used herein can refer to a point in a plane that can serve as an interface at an x, y, z axis intersection of the stab flanks of the pin member and the box connector. The point can be a visual aid and no actual contact is desired.

The term "plane restriction" as used herein can refer to a planar surface area having a length and an angle. The contact plane can act as a wall, or another similar interface of the stab flanks of the pin member and the box connector. In embodiments, the contact plane can have a length dimension. In embodiments, the surface area can be large, such as, having a dimensions equivalent to ¾ of the distance from root to crest of the thread tooth. In other embodiments the surface area can be small, having a dimension equivalent to one thousandths of the distance from the root to the crest of the thread tooth.

The term "flank angle" as used herein can refer to an angle of either a stab flank or a load flank. The flank angle can refer to an acute angle in a plane coinciding with a longitudinal pipe axis. The flank angle can be measured between a flank of a box connector and a plane (e.g. a box stab flank angle) or a flank of a pin member (e.g., a pin stab flank angle) and a plane, wherein the plane can be positioned 90 degrees to the longitudinal pipe axis. The flank angle can be positive or "a plus number" if the flank faces toward the crest. The flank angle can be minus or "a negative number" if the flank faces toward the root.

The term "pin crest" as used herein can refer to the apex of a thread form on the pin member, such as a buttress thread form. The apex or crest, for example on a buttress thread form of the pin member, can be trapezoidal in shape, such as square or rectangular.

The term "pin load flank" as used herein can refer to a portion of the pin member that can conjoin and transfer an axial tension after the pin member conjoins the box connector. The pin load flank can be a surface of the pin thread tooth opposite the pin stab flank.

As used herein, the term "pin member" can refer to a male threaded portion of a threaded connection which can be made up of external threads in a helical configuration. The pin member can engage a box connector. The pin member can be formed on a pipe or another piece of steel that is round and has a conduit therein, such as a tubular. The pin member, in embodiments, can be a separate piece of a pipe joint.

The term "pin root" as used herein can refer to a valley portion of a thread form of the invention. The valley for the thread form can be trapezoidal in shape, such as, square or rectangular. The pin root can be adjacent the pin thread tooth.

The term "pin stab flank" as used herein can refer to a surface of the pin thread tooth that can meet a box connector stab flank to restrict the axial movement of the threaded connection prior to threading pipes into the threaded connection. The pin stab flank can provide compressive load resistance once the threads of the connections, which can be pipes in an embodiment, are engaged.

The term "pin thread" as used herein can refer to an external thread of a pin member. The pin thread can have a load flank, a stab flank, a root and a crest. A pin thread is commonly referred to as a male member that joins to a female thread, usually in a threaded configuration.

The term "pin thread tooth" as used herein can refer to a portion of the pin member which can remain after a groove has been cut in material forming the pin, such as by a threading tool. The "pin thread tooth" can have three sides, a stab flank, a pin crest and a load flank.

The term "taper" as used herein can refer to an angle forming a trajectory along which the thread tooth can extend from a longitudinal axis of a pipe.

The embodiments relate to a threaded connection for engaging a first tubular with a second tubular having a box connector. The threaded connection can have a box connector with box threads having a plurality of box thread teeth each with a box crest, a box load flank, a box stab flank and a box root. The threaded connection can have a pin member with pin threads, wherein each pin thread can have pin thread teeth with a pin crest, a pin load flank, a pin stab flank. The threaded connection can have a pin root and a restriction between the pin member and the box connector on the stab flanks, wherein the restriction does not touch the pin member. The restriction can form a first channel and a second channel for containing a thread sealing compound.

In embodiments, the threaded connection can be a buttress connection.

By using two channels, the threaded connection can support a higher differential pressure so that leaks can only occur at higher pressure in the dual channel threaded connector as compared to single channel threaded connectors.

In embodiments, the threaded connection can have substantially no galling occur after at least three assembly and disassembly operations of the threaded connection.

Turning now to the Figures, FIG. 1A depicts an unmated version of a threaded connection according to one or more embodiments.

The threaded connection 10 can include a box connector 20 with a box thread 21 and a pin member 40 with a pin thread 41.

The box thread 21 can include box thread teeth 23a-23s and the pin member 40 can include pin thread teeth 43a-43s.

FIG. 1B shows a mated version of the embodiment of FIG. 1A.

The threaded connection 10 is shown having the box connector 20, the pin member 40 and the pin thread teeth 43a-43s engaging the box thread teeth 23a-23s.

FIG. 1C is a detail of two box thread teeth and a pin thread tooth forming a restriction location according to one or more embodiments.

In this embodiment, box thread teeth 23i and 23h are shown connected to either side of a pin thread tooth 431 forming a restriction 81.

Each box thread tooth can have a box crest 22, a box load flank 26, a box stab flank, and a box root 24 can be adjacent the box thread tooth.

In embodiments, for example, the box thread can have from 1 to 30 box thread teeth per inch. In embodiments for a buttress thread, for example, five box thread teeth can be used per inch.

In embodiments, the box thread tooth width can be large enough to sustain shear stresses when connected to the pin thread teeth.

In embodiments, the box thread teeth can be graduated in height from 0.001 inch to up to 6 inches. A wide base relative to the height of the box thread tooth can be configured such as a base of 0.1 inch in width relative to a height of 0.062 inches.

Each pin thread tooth can have a pin crest 42, a pin load flank 46, a pin stab flank 48 and a pin root 49 can be adjacent the pin thread tooth.

The restriction 81 is shown disposed between the pin thread tooth 431 and the box thread tooth 23i on the box stab flank 28.

The restriction 81 is contactless, that is without contact forming between the pin member and the box connector. This can be further described as the pin stab flank as not in contact with the box stab flank.

The restriction 81 can form a first channel 60 and a second channel 70 for containing a thread sealing compound. In embodiments, the thread sealing compound can be, but is not limited to, a grease, a wax, a lead, or a polyamide, such as TEFLON™.

The pin stab flank and the box stab flank do not touch when forming the restriction and separation between the flanks is critical.

In embodiments, the restriction can be from 1 percent to 98 percent of the distance between the pin root and the pin crest of the pin thread tooth.

In embodiments, the threaded connection can have the restriction splitting a volume of the thread sealing compound between the first channel and the second channel.

Figure 1D:
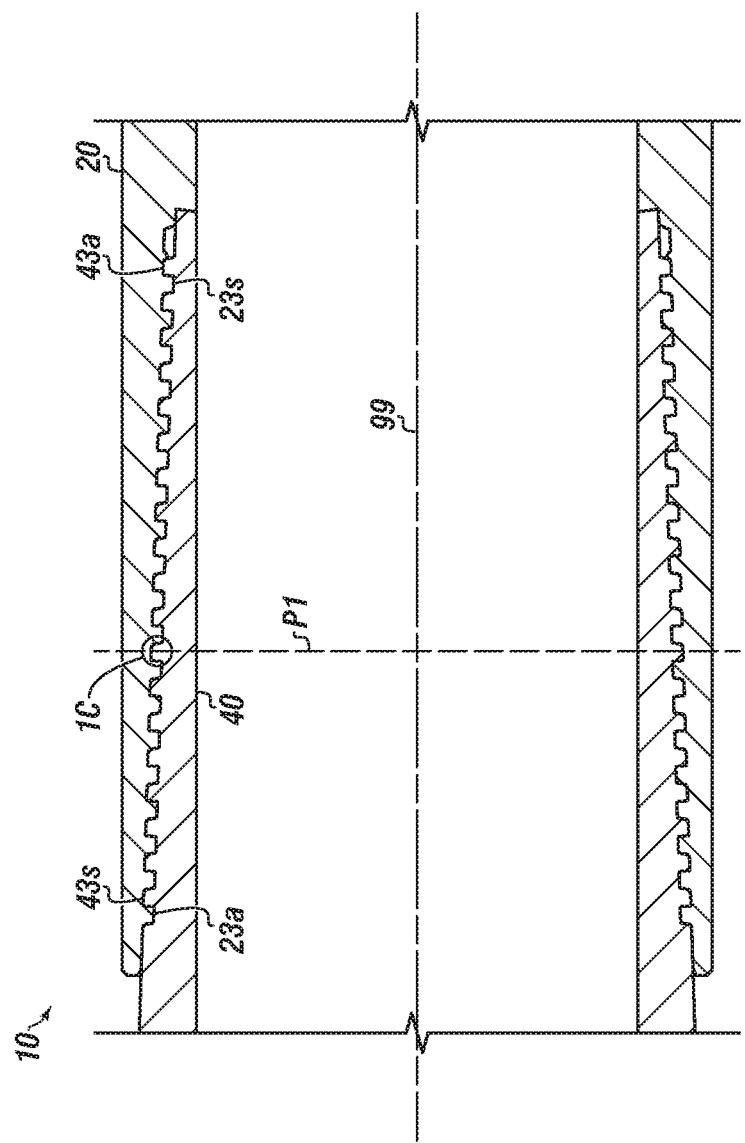
FIG. 1D is a longitudinal cross sectional view of a threaded connection for a pair of tubulars.

Referring now to FIG. 1D, a longitudinal cross sectional view of a threaded connection for a pair of tubulars according to embodiments of the disclosure is shown. FIG. 1D shows threaded connection 10 can include box connector 20 (of a tubular) engaged with pin member 40 (of another tubular). The threaded connection 10 include box thread teeth 23a-s threaded with pin thread teeth 43a-s. The threaded connection 10 can have a longitudinal tubular axis 99. For use as a reference there can be a plane P1 that intersects the axis 99. In an embodiment plane P1 can be 90 degrees (or perpendicular) to the longitudinal tubular axis 99.

FIG. 2 is a detail of a pin thread tooth usable in the threaded connection according to one or more embodiments.

The pin thread tooth 431 having the pin crest 42, the pin load flank 46, the pin stab flank 48, and the pin root 49 is shown.

In embodiments, the pin stab flank can be configured in a single co-linear plane.

The pin stab flank 48 can have a pin upper surface portion 90 connected to the pin crest 42 and a pin lower surface portion 92.

The pin upper surface portion 90 can be tangent to pin upper radii 91. The pin upper radii can be from 0.001 inches to 0.030 inches.

The pin lower surface portion 92 can be tangent to pin lower radii 93. The pin lower radii 93 can range from 0.001 inches to 0.030 inches. The pin lower radii 93 can be tangent to the pin root 49.

The pin stab flank can have a pin center surface portion 94 conjoined between the pin upper surface portion 90 and the pin lower surface portion 92.

The pin center surface portion in cross section can form a pin stab flank angle 95.

The pin stab flank angle 95 is shown at a positive 10 degrees. In embodiments, the pin stab flank angle 95 can range from 1 degree to 30 degrees. In embodiments, the pin stab flank angle 95 can range from −1 degree to −30 degrees.

In embodiments, the stab flank angle 95 can be positive or negative.

The pin load flank angle 152 is shown at a positive 3 degrees. In embodiments, the pin load flank angle 152 can range from 1 degree to 30 degrees. In embodiments, the pin load flank angle 152 can range from −1 degree to −30 degrees.

In embodiments, the pin load flank angle 152 can be negative or positive.

FIG. 3 is a detail of a box thread tooth usable in the threaded connection according to one or more embodiments.

The box thread tooth 23i having the box crest 22, the box load flank 26, the box stab flank 28, and the box root 24 is shown.

The box stab flank can be composed of multi-planar surfaces.

The box stab flank 28 can have a box upper surface portion 84 that can connect to box upper radii 88 and a box lower surface portion 86.

The box upper radii 88 can connect to the box crest 22.

The box upper surface portion 84 in cross section can form a box upper surface portion angle 83 having a slope from 5 degrees to 30 degrees.

A box lower surface portion 86 can be connected to box lower radii 87. The box lower surface portion 86 in cross section can form a box lower surface portion angle 85 having a slope from 1 degree to 30 degrees.

A box center surface portion 89b can be conjoined between the box upper surface portion 84 and the box lower surface portion 86.

The box stab flank 28 is shown made up of the box upper surface portion angle 83, the box lower surface portion angle 85 and the box center surface portion 89b.

The box lower surface portion angle 85 of the box stab flank 28 is shown at a positive 2.92 degrees and the box upper surface portion angle 83 of the box stab flank 28 is shown at a positive 16.78 degrees. In embodiments, the box upper surface portion angle 83 and the box lower surface portion angle 85 angle can range from 1 degree to 30 degrees. In embodiments, the box upper surface portion angle 83 and the box lower surface portion angle 85 can range from −1 degree to −30 degrees.

In embodiments, the box upper surface portion angle 83 and the box lower surface portion angle 85 can be either positive or negative.

The box load flank angle 150 is shown at a positive 3 degrees. In embodiments, the box load flank angle 150 can range from 1 degree to 30 degrees. In embodiments, the box load flank angle 150 can range for −1 degree to −30 degrees.

In embodiments, the box load flank angle 150 can be either positive or negative.

Figure 4B:
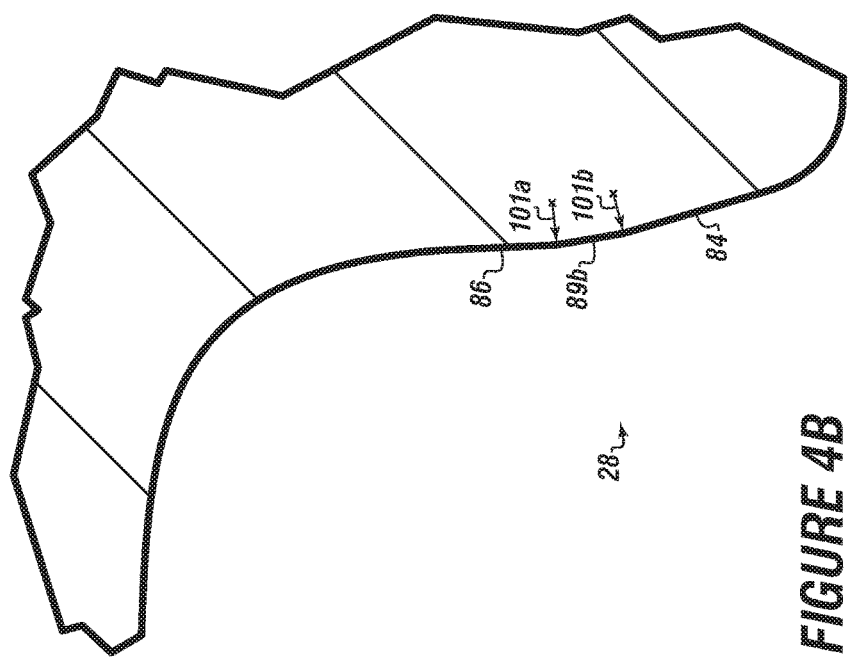
FIGS. 4A and 4B are a detail of two different embodiments of a box stab flank usable in the threaded connection.
Figure 4A:
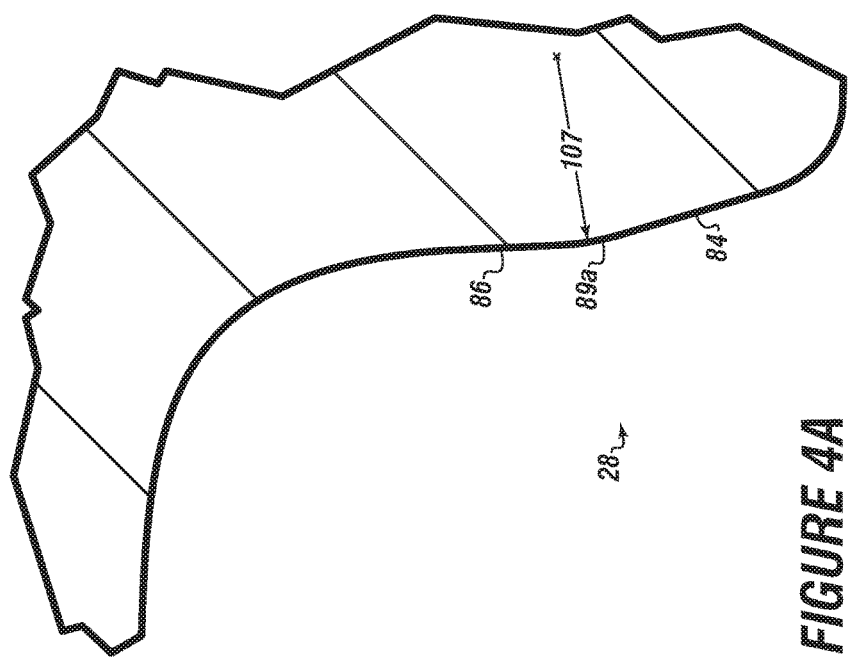

FIGS. 4A and 4B are a detail of two different embodiments of a box stab flank usable in the threaded connection.

The box stab flank can have the box upper surface portion 84, the box lower surface portion 86 and a box center surface portion 89a conjoined between the box upper surface portion 84 and the box lower surface portion 86.

FIG. 4A shows that the box center surface portion 89a can be a single radius 107. FIG. 4B shows that the box center surface portion 89b can be in a plane conjoined by a first radius and second radius 101a and 101b respectively.

The following is an example of how to use the threaded connection according to one or more embodiments, but in not intended to limit the use of the threaded connection.

The threaded connection can be used to engage a first tubular with a second tubular, which can also be pipe, drill string or the like.

To form the threaded connection, a box connector can be formed using a cutting tool to form box thread with a plurality of box roots.

The cutting tools can be used to form box stab flanks, box load flanks and cut a box crest between each pair of box stab flanks and box load flanks forming a plurality of box teeth.

Each box stab flank can be formed using the cutting tool with a box upper surface portion connected to the box crest. The box upper surface portion in cross section can form a box upper surface portion angle.

Each box stab flank can be formed using the cutting tool with a box lower surface portion connected to the box root. The box lower surface portion in cross section can form a box lower surface portion angle.

Each box stab flank can be formed using the cutting tool with a box center surface portion conjoined between the box upper surface portion and the box lower surface portion.

The box center surface portion in cross section can form a stab flank angle, which can be positive, and form an apex between the box lower surface portion and the box upper surface portion.

To form the threaded connection, a pin member with a pin thread can be formed using the cutting tool.

The cutting tool can be used to form a plurality of pin roots.

The cutting tool can be used to form load flanks, pin stab flanks and the pin crest for each pin root forming a plurality of pin thread teeth.

Each pin stab flank can be formed to have a pin upper surface portion connected to the pin crest. The pin upper surface portion can be tangent to the pin upper radius.

Each pin stab flank can be formed to have a pin lower surface portion that can be tangent to the pin lower radius. The pin lower radii can be tangent to the pin root.

Each pin stab flank can be formed to have a pin center surface portion conjoined between the pin upper surface portion and the pin lower surface portion. The pin center surface portion in cross section can form a stab flank angle, which can be positive.

The box thread teeth can be mated to the pin thread teeth.

As the box thread teeth engage the pin thread teeth, a restriction can be formed that can simultaneously (a) prevent the box stab flank from contacting the pin stab flank while (b) creating a first channel and a second channel between the box thread teeth and the pin thread teeth. Thus, the formed restriction may result in the box stab flank not in contact with the pin stab flank.

The first channel, the second channel, or both the first channel and the second channel can be configured to contain a thread sealing compound.

By restricting the volume of the first channel and the second channel, the threaded connection can provide a greater pressure resistance from the inside of each tubular to the outside of each tubular.

In embodiments, the box upper surface portion, the box lower surface portion, or both the box upper surface portion and the box lower surface portion can be formed in cross section as a linear surface within a helical plane.

In embodiments, the pin upper surface portion, the pin lower surface portion, or both the pin upper surface portion and the pin lower surface portion can be formed in cross section as a linear surface within a helical plane.

In embodiments, the threaded connection can have the first channel volume decreasing as the slope of the box lower surface portion angle increases and the second channel volume decreasing as the slope of the box upper surface portion angle decreases.

In embodiments, the threaded connection can have the first channel volume increasing as the slope of the box lower surface portion angle decreases and the second channel volume increasing as the slope of the box upper surface portion angle increases.

In embodiments, the threaded connection can have the first channel volume equivalent to the second channel volume.

In embodiments, the threaded connection can have the first channel volume increasing when the lower box radius decreases and the second channel volume increasing when the upper box radius decreases.

In embodiments, the threaded connection can have a restriction that is from 20 percent to 80 percent of a distance between a pin root and a pin crest of a pin thread tooth.

While these embodiments have been described with emphasis on the embodiments, it should be understood that within the scope of the appended claims, the embodiments might be practiced other than as specifically described herein.

What is claimed is:

1. A threaded connection for engaging a pair of tubulars comprising:
    a. a box connector with a box thread, the box thread comprising:
        (i) a box root; and
        (ii) box thread teeth, each box thread tooth of the box thread teeth adjacent the box root, wherein each box thread tooth of the box teeth comprising:
            1. a box crest;
            2. a box load flank; and
            3. a box stab flank, the box stab flank composed of multi-planar surfaces, wherein the box stab flank comprising:
                a. a box upper surface portion connected to a box upper radii, the box upper surface portion in cross section having a box upper surface portion angle respective to a plane that is perpendicular to a longitudinal tubular axis, the box upper surface portion angle being from 5 degrees to 30 degrees;
                b. a box lower surface portion connected to a box lower radii, the box lower surface portion in cross section having a box lower surface portion angle respective to the plane, the box lower surface portion angle being from 1 degree to 30 degrees; and
                c. a box center surface portion conjoined between the box upper surface portion and the box lower surface portion; and
    b. a pin member configured for engagement with the box connector, the pin member having a pin thread comprising:
        (i) a pin root; and
        (ii) pin thread teeth adjacent the pin root, wherein each pin thread tooth of the pin thread teeth comprising:
            1. a pin crest;
            2. a pin load flank; and
            3. a pin stab flank that is linear in cross section, the pin stab flank having a pin stab flank angle respective to the plane, wherein the pin stab flank comprising:
                a. a pin upper surface portion connected to the pin crest, the pin upper surface portion is tangent to a pin upper radii from 0.001 inches to 0.030 inches;
                b. a pin lower surface portion is tangent to a pin lower radii, the pin lower radii ranges from 0.001 inches to 0.030 inches and the pin lower radii is tangent to the pin root; and
                c. a pin center surface portion conjoined between the pin upper surface portion and the pin lower surface portion, wherein the pin stab flank angle is less than the box upper surface portion angle, and wherein the pin stab flank angle is greater than the box lower surface portion angle; and
    wherein when the box thread teeth and the pin thread teeth are fully mated, a restriction extending helically along the box stab flank is formed, the restriction further comprising the box stab flank not in contact with the pin stab flank, and a first channel and a second channel being positioned on opposite sides of the restriction, respectively, and between the box thread teeth and the pin thread teeth, and wherein when mated, the threaded connection has at least one of:
        the first channel volume decreases as the box lower surface portion angle increases and the second channel volume decreases as the box upper surface portion angle decreases;
        the first channel volume increases as the box lower surface portion angle decreases and the second channel volume increases as the box upper surface portion angle increases;

the first channel volume is equivalent to the second channel volume; and the first channel volume increases when the box lower radii decreases and the second channel volume increases when the box upper radii decreases.

2. The threaded connection of claim 1, wherein the box center surface portion is an apex with an apex radius in cross section from 0.001 inches to 0.030 inches between the box upper surface portion and the box lower surface portion.

3. The threaded connection of claim 1, wherein the threaded connection is a buttress connection.

4. The threaded connection of claim 1, further comprising a box load flank angle that is positive and a pin load flank angle that is positive.

5. The threaded connection of claim 1, wherein the box load flank angle ranges from 1 degree to 30 degrees and the pin load flank angle ranges from 1 degree to 30 degrees.

6. The threaded connection of claim 1, further comprising a box load flank angle that is negative and a pin load flank angle that is negative.

7. The threaded connection of claim 6, wherein the box load flank angle ranges from −1 degree to −30 degrees and the pin load flank angle ranges from −1 degree to −30 degrees.

8. The threaded connection of claim 1, wherein the restriction is from 20 percent to 80 percent of a distance between the pin root and the pin crest of each pin thread tooth of the pin thread teeth.

9. The threaded connection of claim 8, wherein the restriction splits a volume of a thread sealing compound between the first channel and the second channel.

10. The threaded connection of claim 9, wherein the thread sealing compound is a grease, a wax, a lead, or a polyamide.

11. The threaded connection of claim 1, wherein the box upper surface portion and the box lower surface portion are each formed in cross section as a linear surface within a helical plane.

* * * * *